Oct. 15, 1946.　　　　L. D. SCHMIT　　　　2,409,517
VALVE CONSTRUCTION
Filed Jan. 17, 1944　　　　2 Sheets-Sheet 1

Inventor
Louis D. Schmit
By: Zabel, Carlson, Gritzbaugh + Walls
Attys.

Oct. 15, 1946.    L. D. SCHMIT    2,409,517
VALVE CONSTRUCTION
Filed Jan. 17, 1944    2 Sheets-Sheet 2
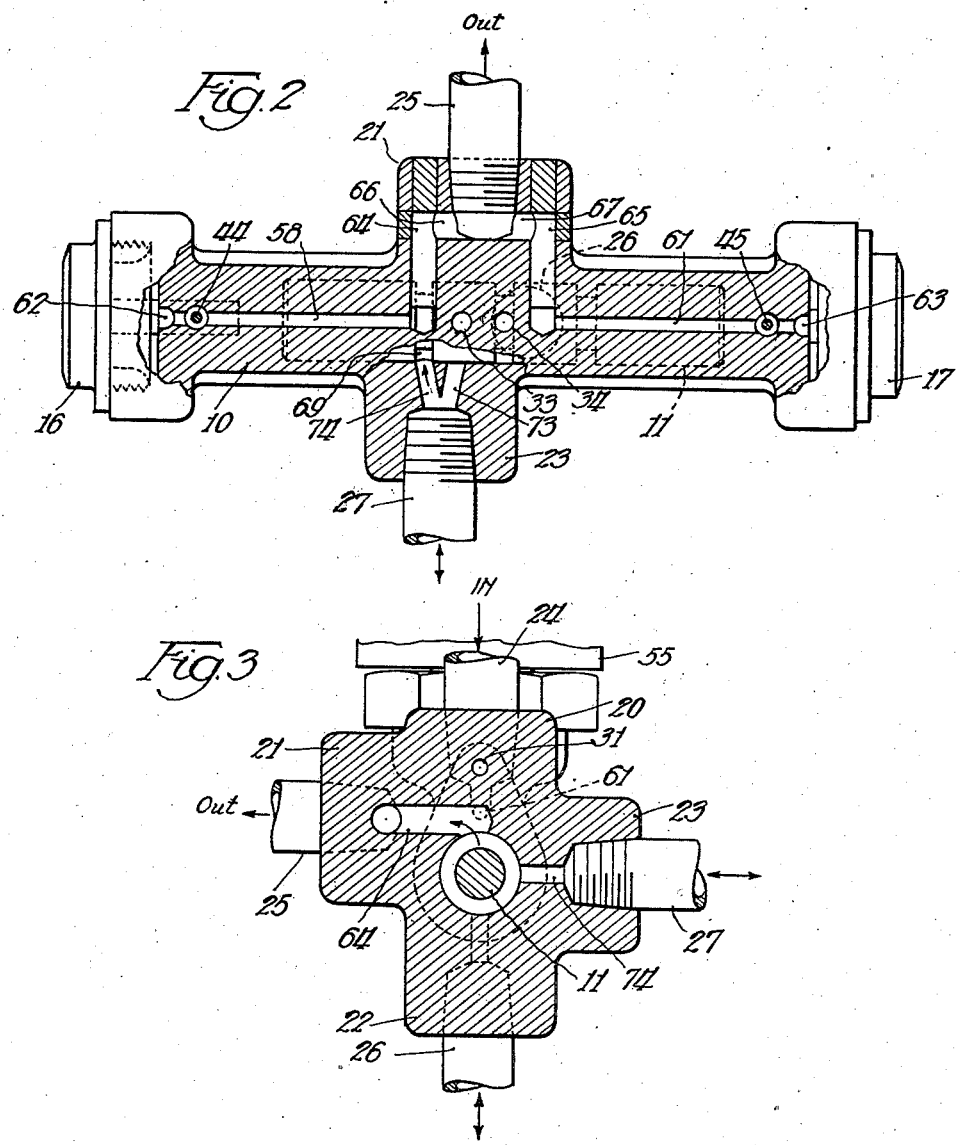

Patented Oct. 15, 1946

2,409,517

UNITED STATES PATENT OFFICE 2,409,517

VALVE CONSTRUCTION

Louis D. Schmit, Savanna, Ill.

Application January 17, 1944, Serial No. 518,546

4 Claims. (Cl. 137—139)

The present invention relates to control valves and has as its principal object the provision of a balanced type of control valve wherein the pressure of the fluid, the flow of which is controlled by the valve, is caused to move the valve under the control of a very light needle valve construction that may be actuated by solenoids drawing a very low current. One feature of the present valve is the provision of a balanced valve and control means of this character that is completely devoid of stuffing boxes that might cause trouble from the standpoint of leakage.

Another feature of the present valve is the novel construction whereby the valve may be caused to assume a safe, neutral position where the control mechanism is changing so rapidly as to prevent the valve from following.

My invention is embodied in a balanced valve construction wherein a valve body is provided with a cylindrical bore in which a piston valve is free to move endwise. The valve body has an inlet from a source of fluid under pressure, a discharge outlet for spent fluid, an outlet leading to the device which receives the fluid under pressure, and a return inlet for the spent fluid from the device. The valve has no external connections but the ends of the valve body are closed by members which have stops extending into the cylindrical bore to limit the endwise movement of the valve. The valve body has two needle valves which control the passage of fluid under pressure from the high pressure inlet to the opposite ends of the valve, these needle valves being solenoid controlled, the entire valve body being so arranged as to avoid any moving parts extending through the walls thereof.

Other and more detailed objects and advantages of the invention will appear from the following description, reference being had to the accompanying drawings wherein a preferred form of the invention is shown. It is to be understood however that the drawings and description are illustrative only and are not to be taken as limiting the invention except insofar as it is limited by the claims.

In the drawings:

Figure 2 is a sectional view taken on the line 2—2 of Figure 1;

Figure 3 is a sectional view taken on the line 3—3 of Figure 1; and

Figure 1:
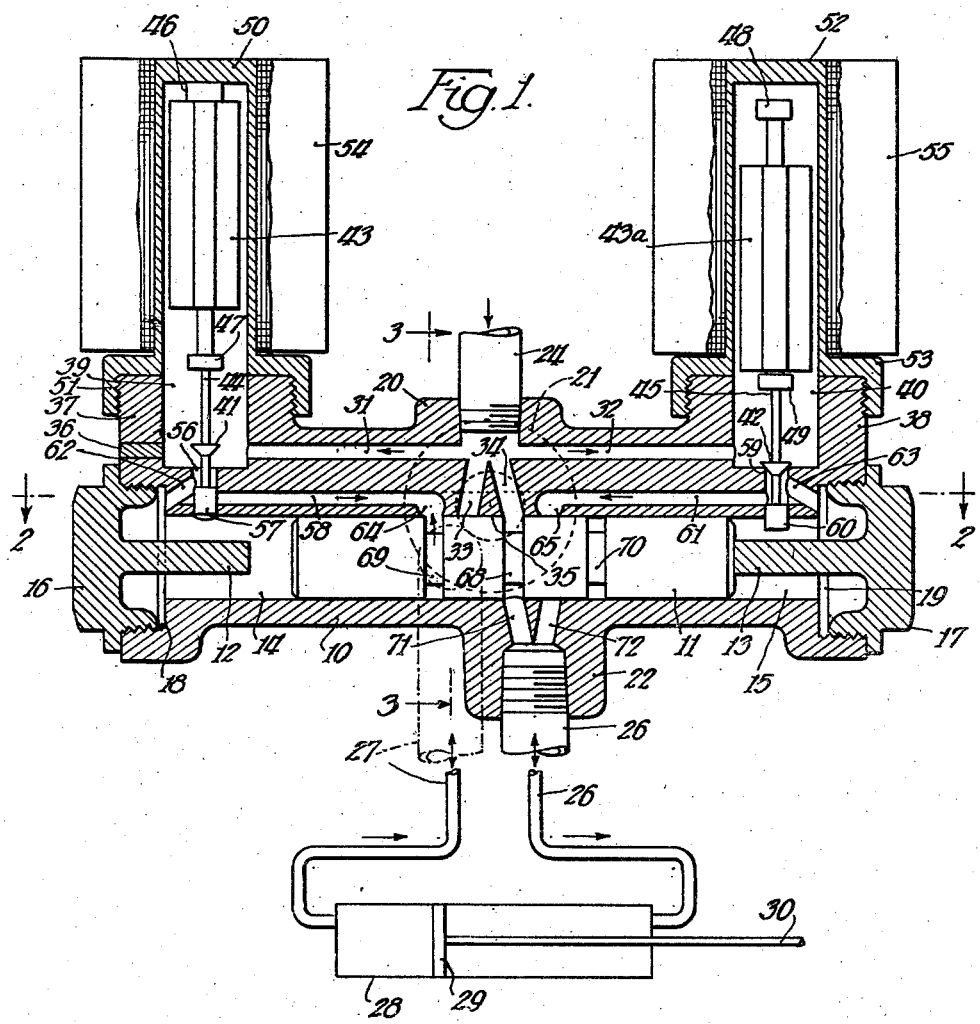
Figure 1 is a sectional view taken longitudinally through a valve body embodying my invention, with parts being shown diagrammatically in connection with the valve body to illustrate the valve operation.

Referring now to the drawings, the present invention is embodied in a valve which is particularly applicable, although not limited to, electronic control systems wherein thermionic vacuum tubes are used as a means of supplying electrical current to effect operation of the valve. As shown the unit comprises a valve body 10 having therein a piston type of valve 11 which is caused to reciprocate between two limiting stops 12 and 13 by the application of fluid under pressure to chambers 14 and 15 that are provided around the stops 12 and 13. The valve body 10 preferably is a solid block provided with a cylindrical bore to receive the valve 11 and to provide the chambers 14 and 15. The stops 12 and 13 are provided on two plugs 16 and 17 which are threaded into enlarged bores 18 and 19 that are provided at opposite ends of the valve body.

The valve body has four bosses 20, 21, 22 and 23 substantially midway between the ends thereof and arranged about the body as shown in Figure 3 of the drawings. The boss 20 is threaded to receive an inlet conduit 24 that is adapted to connect the valve to a source of fluid under pressure. The boss 21 is threaded to receive a conduit 25 which leads to a point of discharge for spent fluid. The point of discharge may of course be the inlet to a pump that supplies fluid under pressure to the conduit 24. The boss 22 is threaded to receive a conduit 26 which is adapted to conduct fluid to and from a cylinder 28 or other device which is to be operated by the fluid under pressure. The boss 23 is threaded to receive a conduit 27 which forms the other conduit for transmitting fluid to and from the work performing device 28.

For purposes of illustration I have used a cylinder to indicate the work performing device 28, a piston 29 being shown in the cylinder and a piston rod 30 being shown as the means through which the fluid under pressure is caused to actuate some movable apparatus such as a work table. A much larger valve similar to the valve 11 may also be actuated by the fluid delivered through the conduits 26 and 27 in the same manner as it actuates the piston 29.

It will be noted that the conduit 24 opens into two oppositely directed channels 31 and 32 in the valve body and two channels 33 and 34 that communicate with the cylindrical bore of the valve body in which the valve 11 is located. The channels 33 and 34 as shown diverge toward the valve receiving bore of the body so as to provide a substantial surface 35 between these two channels where they enter the valve receiving bore of the body. The channels 33 and 34 can be drilled through the threaded opening that receives the conduit 24. The channels 31 and 32 are drilled lengthwise of the valve body from one end thereof and a plug 36 closes the end of the drill opening.

Two bosses 37 and 38 are formed on the valve body in parallel relation to the boss 20 and these bosses are drilled large enough to provide recesses 39 and 40 that connect with the outer ends of the channels 31 and 32. Two needle valves 41 and 42 extend down into the recesses 39 and 40 and control the passage of fluid from the channels 31 and 32 through the valve body to the valve receiving bore thereof. These needle valves carry solenoid armature or core portions 43 and 43a thereon, which armature portions are free to reciprocate between two stops provided on the stems 44 and 45 of the needle valves. This insures opening of the valves against the pressure. The portion 43 is reciprocable between two stops 46 and 47. The portion 43a is reciprocable between two stops 48 and 49. A coil-carrying shell 50 encloses the portion 43 and has a threaded head 51 that threads onto the boss 37. In a like manner a shell 52 has a head 53 that threads onto the boss 38. The shells 50 and 52 carry energizing solenoids 54 and 55, respectively. As pointed out earlier in the general description, these solenoids may be energized from any suitable control device such as a thyratron tube that responds to some particular condition that is used as the control condition for operating the valve.

The needle valve 41 engages a valve seat 56 and the stem 44 of the valve extends through this seat where it is provided with an enlarged cylindrical valve portion 57 that functions to close and open one end of a bleed passage 58 in the valve body. Likewise the valve 42 cooperates with a seat 59 and its stem 45 extends through the valve seat and carries a valve portion 60 that is adapted to close one end of a bleed passage 61 that extends lengthwise of the valve body. The bores for the valve seats 56 and 59 are drilled through the bottoms of the recesses 39 and 40 and this drilling is extended into the valve receiving bore of the valve body so as to provide guides for the valve portions 57 and 60. It will be evident from Figure 1 that the channels 58 and 61 can be bored from the ends of the valve body. Likewise by-pass openings 62 and 63 are drilled into the bores for the valve seats 56 and 59 to by-pass fluid from the valve seats 56 and 59 around the valve portions 57 and 60 into the chambers 14 and 15. It will be noted that the plugs 16 and 17 are hollowed out so as to provide ample space for the fluid to flow into chambers 14 and 15.

Referring now to Figures 2 and 3, it will be noted that the bleed passages 58 and 61 open into two outlet passages 64 and 65 provided in the boss 21. These passages are connected to the outlet 25 by two passages 66 and 67. The bleed passages 58 and 61 are thus continuously in communication with the outlet 25. The outlet passages 64 and 65 extend to the main bore of the body 10 so that they may deliver fluid from the conduits 27 and 26, respectively, to the outlet 25.

The valve 11 comprises a cylindrical body that has three control channels comprising annular grooves 68, 69 and 70. The groove 68 is centrally disposed with respect to the valve 11. When the valve 11 is in the position shown in Figure 1 the groove 68 connects the passage 34 with a passage 71 in the boss 22 that leads to the conduit 26. A second passage 72 leads from the conduit 26 to the bore of the valve 10. This passage cooperates with the groove 70 to connect the conduit 26 to the discharge passage 65 when the valve 11 is positioned against the stop 12. When the valve 11 is against the stop 12 the groove 68 connects the passage 33 with a passage 73 in the boss 23 that leads to the conduit 27. The boss 23 has another passage 74 that leads from the conduit 27 to the valve bore. The passage 74 cooperates with the groove 69 to connect the conduit 27 to the discharge passage 64 when the valve 11 is against the stop 13 (the position shown in Figures 1–3).

In operation, when the parts are positioned as shown in Figures 1–3 the source of fluid is connected from the conduit 24 through the valve passages 34, 68 and 71 to the conduit 26 to move the piston 29 to the left. The solenoid 54 is energized and the armature 43 is lifted. The needle valve 41 is unseated so that the fluid pressure is directed through the passages 31 and 62 into the chamber 14 forcing the valve 11 against the stop 13. The chamber 15 is connected to the outlet conduit 25 by the passages 61, 65 and 67. Also, the conduit 27 is connected to the outlet conduit 25 by the passage 74, the groove 69 and the passages 64 and 66. The flow of fluid from the chamber 14 through the passage 58 to the outlet passage 64 is blocked by the valve portion 57.

If the solenoid 55 is energized and the solenoid 54 de-energized the needle valve 42 will be lifted by the armature 43a. This will let fluid flow from the inlet 24 through the passage 32 and the passage 63 to the chamber 15. The valve portion 60 will block the bleed passage 61. Release of the armature 43 by the de-energizing of the solenoid 54 allows it to drop and the valve 41 will close. The chamber 14 is placed in communication with the bleed passage 58 as the valve portion 57 moves down. The valve 11 will move toward the stop 12 as fast as the bleed passage 58 will permit the liquid to escape from the chamber 14. In moving the valve 11 cuts off the flow from the passage 34 through the groove 68 to the passage 71 and closes the communication from the passage 74 through the groove 69 to the outlet passage 64.

Figure 4:
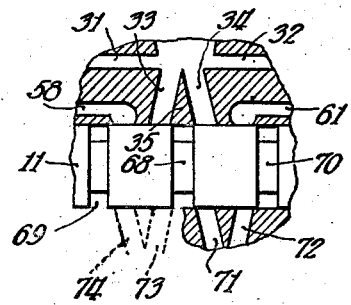
Figure 4 is a fragmentary sectional view similar to Figure 1 but with the parts in a different position to illustrate a safety feature of the invention.

The above changes are completed when the valve 11 has moved far enough to bring the groove 68 in line with the portion 35 of the valve bore, but at this point the fluid is blocked from flowing through the passage 33 to the passage 73 (see Figure 4). This is an important feature of the present invention that will be more fully explained later.

As the fluid continues to escape from the chamber 14 through the bleed passage 58, the valve 11 moves further toward the stop 12 and starts to open the way for fluid to flow from the passage 33 through the groove 68 to the passage 73 to supply fluid under pressure to the conduit 27. This movement also opens the way for fluid to flow from the conduit 26 through the passage 72 and the groove 70 to the outlet passage 65. In this manner the movement of the piston 29 is controlled.

The speed of operation of the valve depends upon the rate of escape of fluid through the bleed passages 58 and 61. This speed can be varied by adjusting the valve portions 57 and 60 on their stems to more or less close the bleed passages. Usually however the speed may be predetermined and the bleed passages drilled to the proper size in the making of the valve.

The provision of the portion 35 which places the valve in a neutral position between the two opposite operating positions is particularly important to fast operating controls where the control condition may repeatedly change too rapidly to permit the valve to complete its travel before reversal of the solenoids. If the solenoids are alternately energized at too fast a rate to permit the valve to follow, the net result is a movement of the valve toward a safe neutral position because the initial change starts the valve 11 from one extreme position. The reversal then has to overcome the valve movement. The armatures, when attracted, open the needle valves quickly, but in closing the needle valves lag. Thus there is a tendency for the valve 11 to creep to neutral position. In this position fluid pressure is cut off from the controlled device 28.

The valve has no moving part extending through a wall thereof so that the need for packings or stuffing boxes around such a part is avoided. This makes the valve upkeep low. All of the parts are readily accessible for inspection and replacement. The operating current necessary is merely that to lift the needle valves so the device may be used with low current electric control equipment.

From the foregoing description it is believed that the nature of my invention and the advantages thereof will be readily understood by those skilled in this art.

Having thus described my invention, what I claim as new and desire to secure by Letters Patent is:

1. A valve body having a bore therethrough, said bore being enlarged at both ends, a valve slidable in said bore, means closing the enlarged ends of said bore and having stops projecting inward beyond the enlarged portion of the bore to limit the movement of the valve, said valve body having an inlet opening provided with two branches extending to the bore, two combination inlet and outlet openings each having two branches extending to the bore, and an outlet opening having two branches extending to the bore, said valve having channels therein operable when the valve is against one of said stops to provide fluid passage from the inlet opening through one of its branches to one of said combination openings through one of its branches and to provide fluid passage from the other combination opening through one of its branches to the outlet opening through one of its branches, the valve channels being operable when the valve is against the other stop to provide fluid passage in a reverse direction through the combination openings by means of the other branches in the several inlet and outlet openings.

2. A valve body having a bore therethrough, said bore being enlarged at both ends, a valve slidable in said bore, means closing the enlarged ends of said bore and having stops projecting inward beyond the enlarged portion of the bore to limit the movement of the valve, said valve body having an inlet opening provided with two branches extending to the bore, two combination inlet and outlet openings each having two branches extending to the bore, and an outlet opening having two branches extending to the bore, said valve having channels therein operable when the valve is against one of said stops to provide fluid passage from the inlet opening through one of its branches to one of said combination openings through one of its branches and to provide fluid passage from the other combination opening through one of its branches to the outlet opening through one of its branches, the valve channels being operable when the valve is against the other stop to provide fluid passage in a reverse direction through the combination openings by means of the other branches in the several inlet and outlet openings, the branches from the inlet opening to the bore being separated at the points where they enter the bore by a distance greater than the width of the corresponding channel in the valve to provide a neutral valve position intermediate its limiting positions against the stops.

3. A valve body having a bore therethrough, said bore being enlarged at both ends, a valve slidable in said bore, means closing the enlarged ends of said bore and having stops projecting inward beyond the enlarged portion of the bore to limit the movement of the valve, said valve body having an inlet opening provided with two branches extending to the bore, two combination inlet and outlet openings each having two branches extending to the bore, and an outlet opening having two branches extending to the bore, said valve having channels therein operable when the valve is against one of said stops to provide fluid passage from the inlet opening through one of its branches to one of said combination openings through one of its branches and to provide fluid passage from the other combination opening through one of its branches to the outlet opening through one of its branches, the valve channels being operable when the valve is against the other stop to provide fluid passage in a reverse direction through the combination openings by means of the other branches in the several inlet and outlet openings, said body having two bores alongside the main bore extending from the inlet and outlet openings respectively, and opening into the main bore at its ends, to pass fluid to and from the end chambers.

4. A valve body having a bore therethrough, said bore being enlarged at both ends, a valve slidable in said bore, means closing the enlarged ends of said bore and having stops projecting inward beyond the enlarged portion of the bore to limit the movement of the valve, said valve body having an inlet opening provided with two branches extending to the bore, two combination inlet and outlet openings each having two branches extending to the bore, and an outlet opening having two branches extending to the bore, said valve having channels therein operable when the valve is against one of said stops to provide fluid passage from the inlet opening through one of its branches to one of said combination openings through one of its branches and to provide fluid passage from the other combination opening through one of its branches to the outlet opening through one of its branches, the valve channels being operable when the valve is against the other stop to provide fluid passage in a reverse direction through the combination openings by means of the other branches in the several inlet and outlet openings, said body having two bores alongside the main bore extending from the inlet and outlet openings respectively and opening into the main bore at its ends, to pass fluid to and from the end chambers, and valve seats in each of said two bores adjacent their outer ends for reception of a control valve to govern the flow of fluid to and from said end chambers.

LOUIS D. SCHMIT.